Oct. 15, 1946.                L. C. SASSMANHAUSEN                2,409,593
                                 FLUID COUPLING
                    Filed April 10, 1944        3 Sheets-Sheet 2

INVENTOR.
Lee C. Sassmanhausen.
BY Harness & Harris
ATTORNEYS.

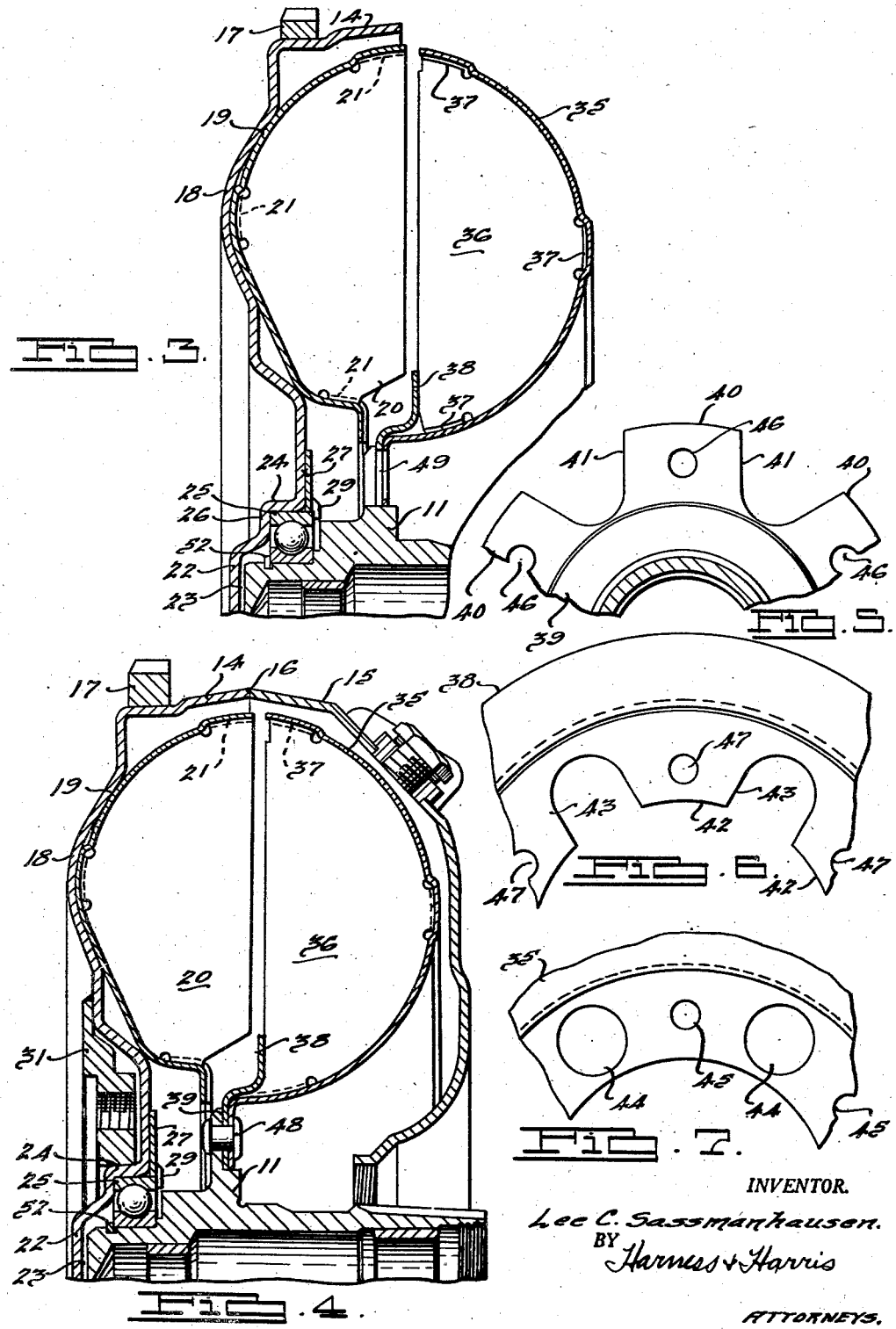

Patented Oct. 15, 1946

2,409,593

UNITED STATES PATENT OFFICE 2,409,593

FLUID COUPLING

Lee C. Sassmanhausen, Grosse Pointe Woods, Mich., assignor to Chrysler Corporation, Highland Park, Mich., a corporation of Delaware Application April 10, 1944, Serial No. 530,418

4 Claims. (Cl. 60—54)

This invention relates to improvements in fluid coupling structures.

Among the objects of the invention is the provision in a fluid coupling structure preferably fabricated in the main from a plurality of sheet metal stampings of improvements for facilitating assembly of the components of the structure, for sealing the structure to prevent undesired escapement of the fluid operating medium therefrom, and for journalling one of the relatively rotatable parts drivingly associated with the structure.

More specifically, an object of the invention is the provision of a fluid coupling casing including a one-piece impeller-driver sheet metal stamping so contoured as to provide a seat for a bearing journalling a runner-driven element, the stamping adjacent said seat serving to center the casing relative to the driver member therefor; to provide an improved structural arrangement for retaining the bearing against displacement relative to its seat and to facilitate assembly of the retainer when the bearing is seated; and to provide a runner-driven element which is hollow and self-sealed, particularly at an end portion thereof normally in communication with the fluid medium contained within the coupling casing.

Other objects and advantages of the invention will be more apparent from the following description taken in connection with the accompanying drawings, wherein:

Fig. 3 is a view illustrating assembly of the components of Fig. 2.

Fig. 4 is a view similar to Fig. 3 but illustrating further assembly.

Figs. 5, 6, and 7 are fragmentary views respectively showing the attaching flanges of the runner hub, baffle, and runner vane carrier.

Figure 1:
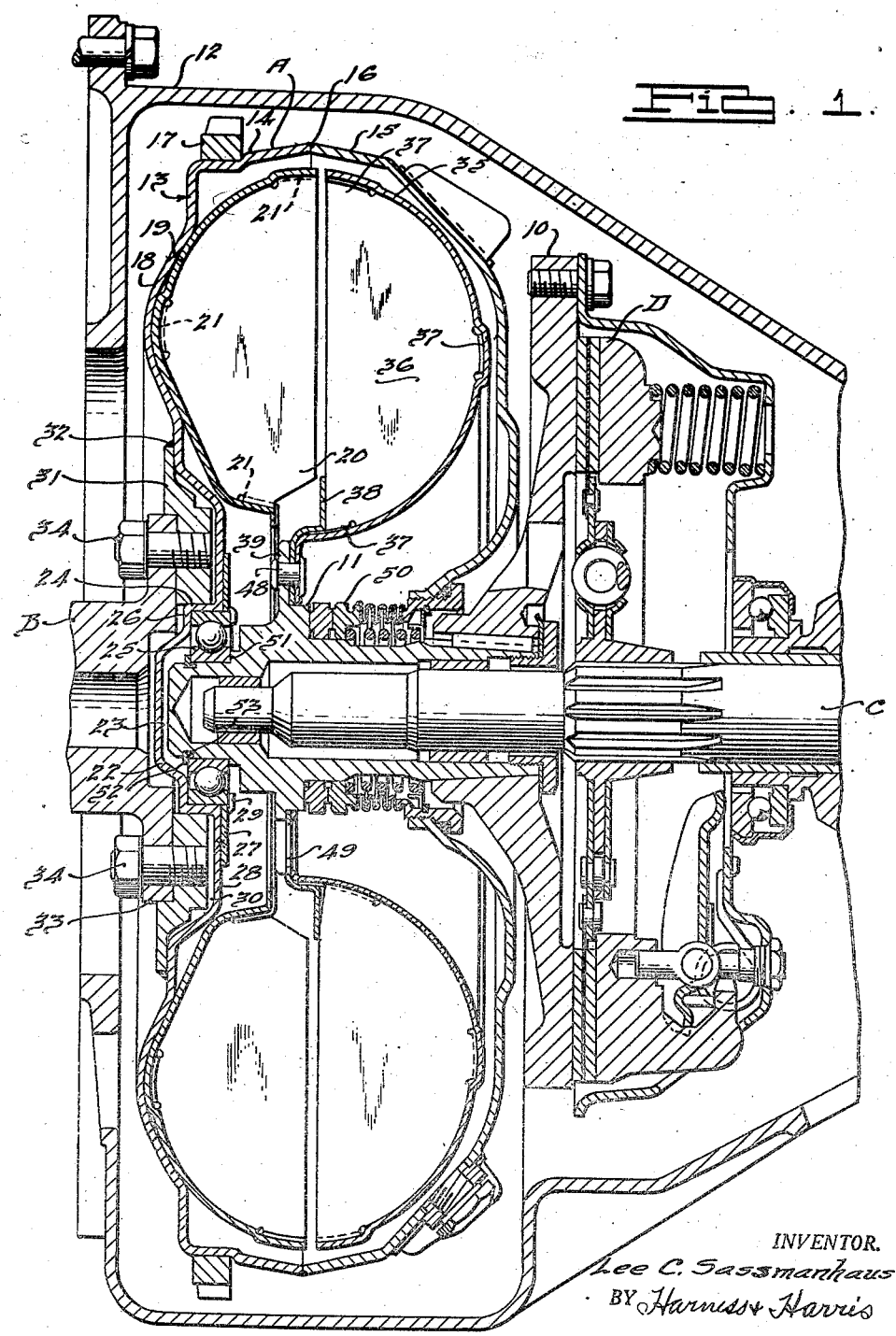
Fig. 1 is a fragmentary sectional view in side elevation illustrating a coupling embodying the invention.

Referring to Fig. 1, the fluid coupling A functions to transmit a drive between a driving shaft B and a driven shaft C, the latter being drivingly connected with the coupling by a friction clutch D of conventional design and specifically including a driving plate 10 splined to a sleeve-like runner hub 11. A housing 12 is provided for the structures A and D.

The fluid coupling A includes an annular casing, generally designated by the numeral 13, consisting of segments 14 and 15, preferably of sheet metal, having the free edges at the radially outer periphery thereof welded together as at 16. The segment 14 has a seat on which a starter ring gear 17 is mounted, and an annular portion dish-shaped in cross section as at 18 welded to a carrier 19 having a plurality of radially extending, circumferentially spaced fluid passage forming vanes, a typical one of which is shown at 20, provided with a plurality of tabs 21 welded to the carrier 19.

Generally centrally thereof, the segment 14 has a hollow boss 22 forming an internal well or pocket 23 opening toward the shaft C and hub 11 and receiving the adjacent end portion of the latter therein. The boss 22 includes an annular axially extending flange 24 providing a seat internally of the well 23 for a bearing unit 25 journalling the hub 11. A generally radially extending flange 26 at the boss 22 prevents axial displacement of the unit 25 relative to its seat in one direction axially and an annular retainer 27, secured as by welding to the generally radially extending portion 28 of the casing segment 14, has a plurality of fingers 29 engaged with the unit 25 to prevent displacement thereof axially in the other direction relative to the seat. The unit 25 being axially fixed on the hub 11 between the shoulder 51 and ring 52, the retainer thus prevents axial separation of the impeller and runner structures.

The generally radially extending portion 28 of the segment bounds a recess, indicated at 30 and opening axially opposite to the well 23, in which is received in part an annular member 31 having the radially outer periphery thereof abutting and welded to the segment 14 as indicated at 32. The member 31 has a central opening receiving the boss 22 and an annular recess into which a flange 33 of the shaft B extends, this flange and the member 31 having a plurality of circumferentially spaced registering openings respectively receiving a stud 34 threaded into the openings of the member 31.

The runner structure includes an annular sheet metal vane carrier 35 dish-shaped in cross section and a plurality of circumferentially spaced radially extending fluid-passage-forming vanes, one of which is shown at 36. Each such vane has a plurality of tabs 37 welded to the carrier 35. The impeller and runner structures cooperate to form a fluid working circuit common to couplings of this type into which extends a baffle 38. The hub 11 has an annular attaching flange 39 against which abuts a portion of the baffle 38, and the carrier 37 is provided with an annular mounting flange abutting the baffle 38. As shown in Fig. 5, the hub flange 39 includes a plurality of circumferentially alternately arranged fingers 40 and recesses 41 which open radially outwardly. The baffle 38, as shown in Fig. 6, includes a plurality of circumferentially alternately arranged fingers 42 and recesses 43 which open radially inwardly and as shown in Fig. 7 the mounting flange of the carrier 37 includes circumferentially alternately arranged relatively large openings 44 and relatively small openings 45. Each finger 40 has an opening 46 which in assembly is aligned with an opening 47 in a finger 42 and these openings align with an opening 45 to receive an attaching rivet 48. In assembly each recess 41 registers with a recess 43 and opening 44 thereby providing a plurality of circumferentially spaced axially extending passageways, one of which is shown at 49.

The hub 11 extends through a central opening in the casing segment 15 and is sealed externally relative thereto by a suitable sealing unit generally designated by the numeral 50. The driven shaft C extends into and is suitably journalled in the hub 11, the end of the latter being integrally closed. A shoulder 51 of the hub abuts one side face of the bearing unit 25 and a snap ring 52 seated in a peripheral groove 53 of the hub 11 abuts the opposite side face of the bearing unit 25. The end of the hub 11 is tapered to facilitate movement of the ring 52 axially into the groove 53. The ring 52 may be selected from a variety of rings having relatively different widths to thereby compensate for irregularities in manufacture and assembly, due to which the bearing unit 25 may project over a portion of the groove 53.

Figure 2:
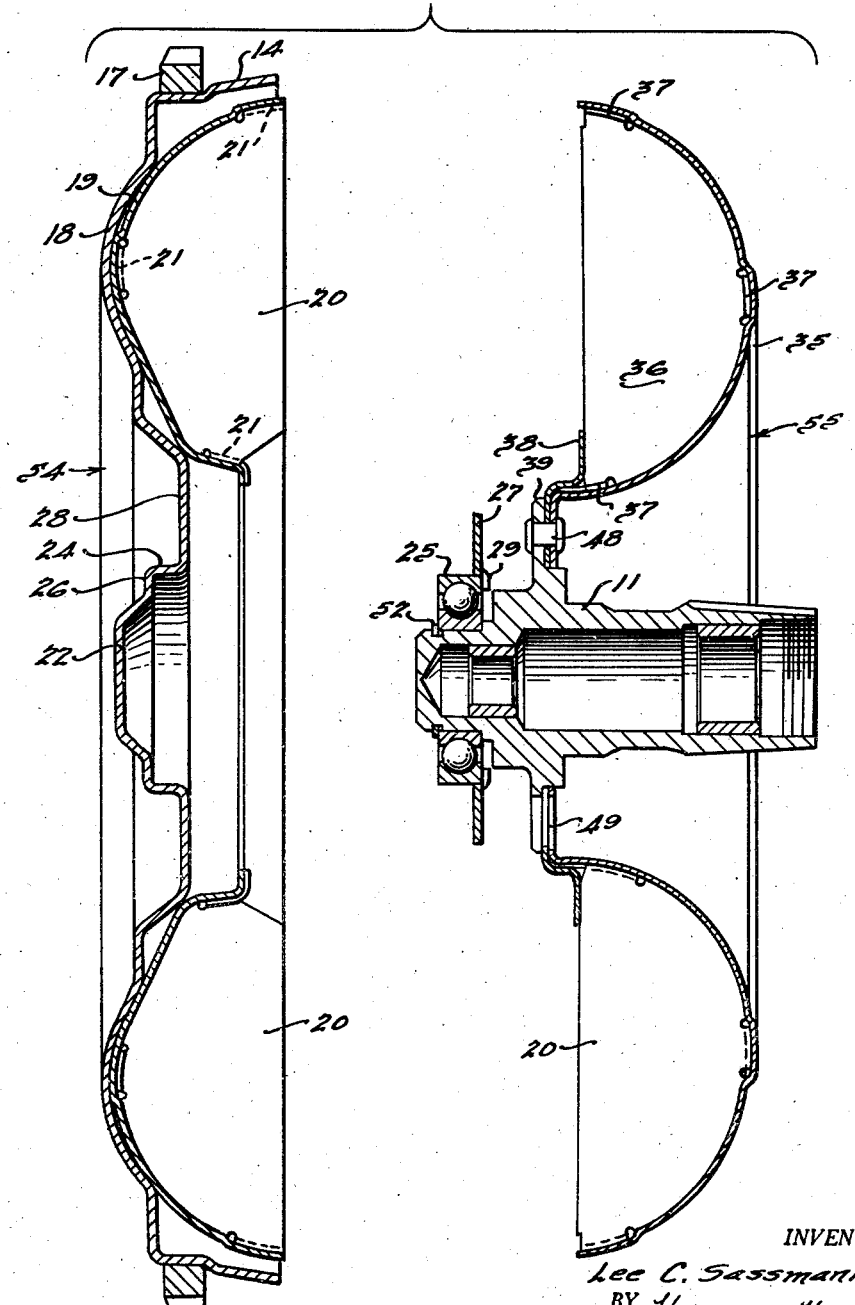
Fig. 2 is a sectional view in side elevation of coupling components preparatory to assembly thereof.

Referring to Fig. 2, there are shown impeller and runner preassemblies respectively designated by the numerals 54 and 55 which are brought together in the relation shown in Fig. 3. In the Fig. 2 showing the annular bearing retainer is carried by the runner assembly 55, being welded to the bearing unit 25. When brought into the Fig. 3 relation the retainer 27 abuts the segment 14 intermediate the dished part 18 and boss 22 thereof. A welding tool is then passed through the circumferentially spaced passageways 49 to weld the retainer 27 to the segment 14 at circumferentially spaced locations. Upon completion of the Fig. 3 assembly, the ring 31 and casing segment are assembled in position relative thereto as shown in Fig. 4.

In assembly of the ring 31, the boss 22 serves to center the latter relative to the casing and thereby assures concentricity of the ring relative to the casing and the Fig. 4 assembly relative to the driver B when the assembly has progressed from the Fig. 4 status to the final form as shown in Fig. 1.

The fluid operating medium has access to the bearing unit 25 and the adjacent end of the sleeve-like hub 11. However, this end being closed, the fluid medium cannot escape from the casing between the hub 11 and shaft C and but a single sealing unit as at 50 is required. The segment 14 being one piece and presenting a continuous side face adjacent the shaft B, no problem of sealing is presented at the central zone adjacent the latter shaft.

Although but one specific embodiment of the invention has herein been shown and described, it will be understood that various changes in the size, shape and arrangement of parts may be made without departing from the spirit of the invention.

I claim:

1. A fluid coupling including vaned impeller and runner structures, an annular casing for said structures including a segment having an annular disk-shaped part drivingly secured to the impeller vanes and an annular bearing seat disposed radially inwardly from said dish-shaped part, a hub mounting said runner structure extending into said casing at said bearing seat, bearing means engaged with said seat journalling said hub in said casing, a retainer engaging said bearing means for preventing unintended axial displacement thereof relative to said seat in one direction axially and adapted to be secured to said segment, said hub and said runner structure including cooperating generally radially disposed attaching portions having registering openings therein for accommodating insertion of a tool therethrough for securing said retainer to said segment when said bearing means is in said seat and said hub is journalled therein.

2. A fluid coupling including vaned impeller and runner structures defining a fluid working circuit, an annular casing for said structures including a segment having an annular dish-shaped part drivingly secured to the impeller vanes and an annular axially extending part defining a bearing seat adjacent the central portion of the coupling, said segment further including a generally radially extending part integral with and intermediate the aforesaid parts, a hub mounting said runner structure extending into said casing at said bearing seat, bearing means engaged with said seat journalling said hub in said casing, a retainer engaging said bearing means for preventing unintended axial displacement thereof relative to said seat in one direction axially and adapted to be secured to the radially extending part of said segment, a baffle extending into said fluid working circuit, said hub, runner structure, and baffle including cooperating generally radially disposed attaching portions having registering openings therein for accommodating insertion of a tool therethrough for securing said retainer to said radially extending segment part when said bearing means is in said seat and said hub is journalled therein.

3. A fluid coupling including vaned impeller and runner structures, an annular casing for said structures including a segment having an annular dish-shaped part drivingly secured to the impeller vanes and an annular bearing seat disposed radially inwardly from said dish-shaped part, a hub mounting said runner structure extending into said casing at said bearing seat, a bearing unit, means fixing said bearing unit against displacement axially on said hub and for movement with the latter to position said bearing unit in said seat, and a retainer element engaged with said bearing unit and said segment for preventing displacement of said bearing unit and said hub relative to said seat and segment axially in one direction, said retainer element encircling said hub and being adapted for engagement with said segment after positioning of said bearing unit in said seat as aforesaid, said hub and said runner structure including cooperating generally radially disposed portions for attaching the same together and having registering openings therein for accommodating insertion of a tool therethrough for securing said retainer element relative to said segment when said bearing unit is positioned in said seat to prevent said relative axial displacement of said segment and said bearing unit.

4. In a fluid coupling for transmitting a drive between driving and driven means, a runner structure drivingly secured to the driven means and including a vaned section and a non-vaned section, an impeller forming structure including a vaned section and a non-vaned section disposed axially between said runner structure and said driving means and drivingly secured to the latter, a bearing seat in said non-vaned section of the impeller forming structure opening axially toward said runner structure, a bearing unit positioned in said seat journalling the non-vaned section of the runner structure relative to the impeller forming structure, means fixing said bearing unit against movement axially relative to the non-vaned section of the runner structure, and a retainer element engaging said bearing unit and impeller forming structure for preventing relative axial separation of said structures in one direction, the non-vaned section of the runner structure having an opening therein accommodating insertion of a tool therethrough in the direction of the impeller forming structure and said driving means for securing said retainer element relative to said impeller forming structure when said bearing unit is positioned in said seat to prevent said axial separation of said impeller and runner structures.

LEE C. SASSMANHAUSEN.